United States Patent

Robertson

[15] 3,706,842

[45] Dec. 19, 1972

[54] METHOD TO DOUBLE TRANSMISSION SPEED OF TELEPHONE NETWORK FACSIMILE

[72] Inventor: Gene D. Robertson, Fort Wayne, Ind.

[73] Assignee: The Magnavox Company, Fort Wayne, Ind.

[22] Filed: Feb. 1, 1971

[21] Appl. No.: 111,376

[52] U.S. Cl. .....................178/6, 178/50, 178/DIG. 3, 179/15 BM

[51] Int. Cl. ...........H04j 9/00, H04l 5/00, H04n 1/40

[58] Field of Search ......178/DIG. 3, 6, 50; 179/2 DP, 179/2.5, 15 BM; 325/36

[56] References Cited

UNITED STATES PATENTS

| | | | |
|---|---|---|---|
| 3,069,679 | 12/1962 | Sweeney et al. | 325/36 X |
| 3,243,507 | 3/1966 | Macovski | 178/DIG. 3 |
| 2,333,969 | 11/1943 | Alexanderson | 178/5.2 R |
| 3,530,385 | 9/1970 | Smith et al. | 178/DIG. 3 |
| 2,808,508 | 10/1957 | Sinninger | 178/2.5 R X |
| 3,553,367 | 1/1971 | Krauss | 178/50 |
| 2,878,318 | 3/1959 | Leek | 178/50 |

*Primary Examiner*—Howard W. Britton
*Attorney*—Woodard, Weikart, Emhardt & Naughton and Richard T. Seeger

[57] ABSTRACT

Material to be sent is scanned two lines at a time and the information in the two lines is transmitted simultaneously. The first line of each pair is encoded and transmitted by a frequency or phase modulated carrier. The second line of each pair is encoded and is used to amplitude modulate the frequency or phase modulated carrier of the first line.

8 Claims, 5 Drawing Figures

INVENTOR
GENE D. ROBERTSON
BY
Woodard Weikart Emhardt & Naughton
ATTORNEYS

INVENTOR
GENE D. ROBERTSON

BY
Woodard, Weikart, Emhardt & Naughton
ATTORNEYS

METHOD TO DOUBLE TRANSMISSION SPEED OF TELEPHONE NETWORK FACSIMILE

BACKGROUND OF THE INVENTION

1. Field of the Invention

The present invention relates to a system for sending information on a switched telephone network.

2. Description of the Prior Art

Typical approaches to increasing the speed of transmission of facsimile over the voice grade telephone line have involved systems where only one line at a time is scanned. Typical equipment can transmit one letter size document in six minutes using conventional analog signaling methods. More efficient encoding and modulation methods (such as tri-level and duo binary modems) can be used to about double this speed (as in U.S. Pat. No. 3,495,032 to Smith). Analog signals have been converted to binary which have then been converted into multi-level signals. These signals then are used to frequency or phase modulate a carrier for transmission over telephone circuits.

SUMMARY OF THE INVENTION

This invention relates to sending a carrier over the switched telephone network. The carrier is only frequency modulated by one signal and only amplitude modulated by another. Prior art techniques have not taken advantage of the fact that the switched telephone network has a capability of handling peak power which is considerably in excess of the maximum average power. Because of this fact, by additionally amplitude modulating a frequency modulated carrier, an additional signal can be carried without an appreciable loss of signal quality of the first.

By scanning two lines at a time, the speed of sending a letter by facsimile can be doubled.

DESCRIPTION OF THE PREFERRED EMBODIMENT

Figure 1:
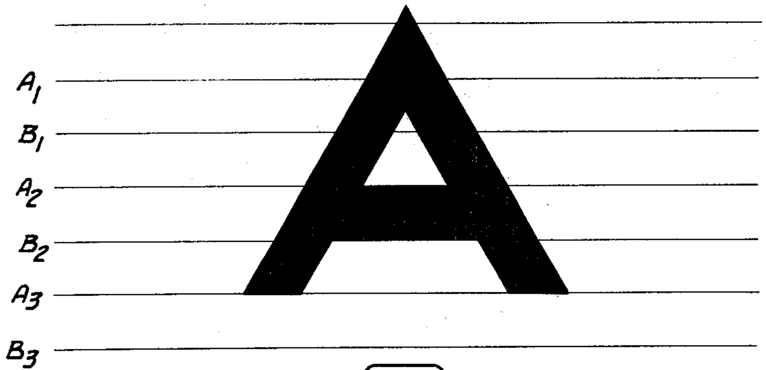
FIG. 1 is an enlarged view of a letter being scanned, with the lower boundary of each scan line indicated by a designated line.

Referring to FIG. 1 there is illustrated a letter A to be scanned. Three pairs of lines are indicated by the designations to the left of the drawing. The first pair of lines is designated by the subscript 1 and includes lines $A_1$ and $B_1$, the other two pairs are similarly designated with subscripts 2 and 3. These lines represent the lower boundary of a scanned portion associated with each line.

Figure 2:
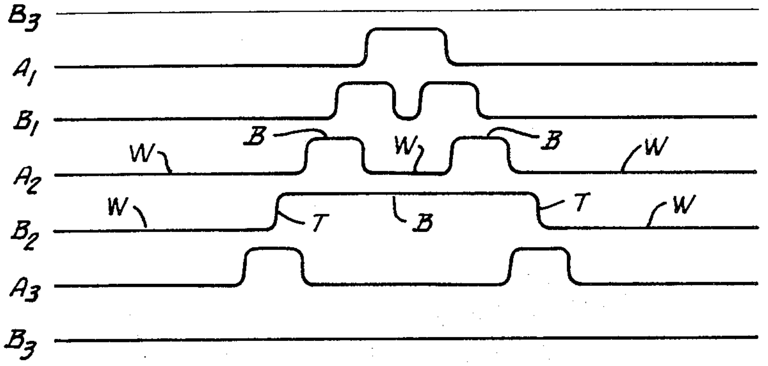
FIG. 2 is a representation of the optical signals obtained from scanning the letter in FIG. 1.

In the preferred embodiment, the scanning mechanism will be of a conventional type which can scan two adjacent lines simultaneously. The optical signals which the scanning mechanism would detect are represented by the lines of FIG. 2. For purposes of explanation, only lines $A_2$ and $B_2$ will be described in detail because both of the other pairs illustrated are similar. In FIG. 2, there is one level for white portions (W) and another level for black portions (B). Line $A_2$ has two black portions and line $B_2$ has one black portion. The transitions (T) from black to white and white to black on line $B_2$ are shown and are gradual due to the aperture of the scanning device.

Figure 3:
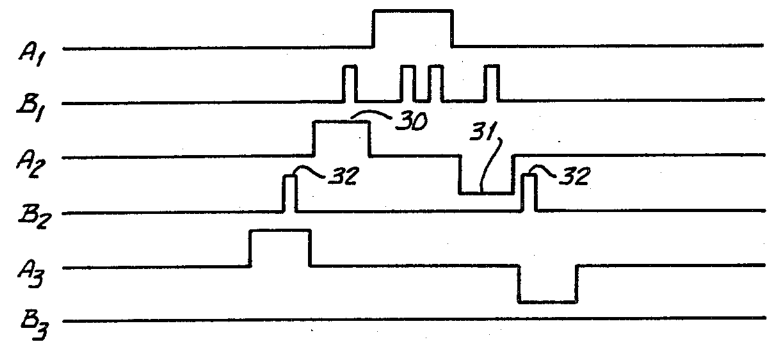
FIG. 3 is a representation of the encoded electrical signals derived from the optical signals of FIG. 2.

The A line of each pair is converted to a three level waveform illustrated in FIG. 3 by a three level encoder in a conventional manner (see J. W. Smith U.S. Pat. No. 3,495,032 for example). The B line of each pair is converted to a series of pulses, each pulse 32 having a constant duration, one pulse 32 for every transition (T) from white to black or black to white. Since the signal of line B of each pair (in FIG. 3) represents only transitions, more than 80 percent and less than 100 percent of the time the signal will be at ground potential (or some other given potential) for typical information bearing media. Although it would be conceivable to have printed matter which would create pulses more than 20 percent of the time, typically pulses will be present less than 10 percent of the time for an item such as a business letter.

Figure 4:
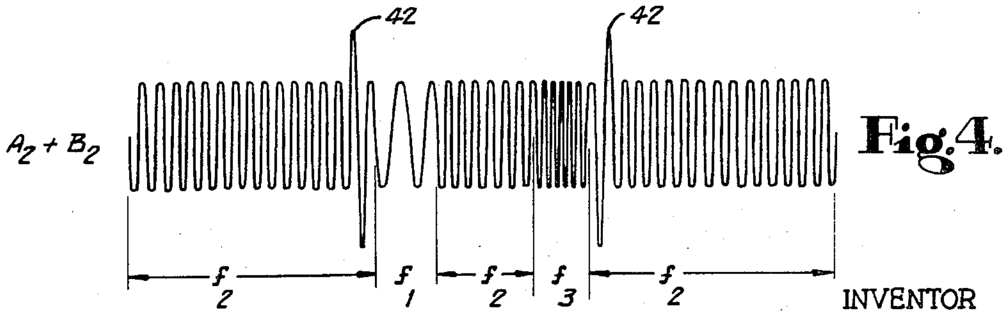
FIG. 4 is a representation of a modulated carrier which was frequency modulated by signal $A_2$ of FIG. 3 and amplitude modulated by signal $B_2$ of FIG. 3.

FIG. 4 represents a modulated carrier which has been frequency modulated by signal $A_2$ of FIG. 3 and amplitude modulated by signal $B_2$ of FIG. 3. There are increases in amplitude at 42 resulting from the pulses 32. There is a decrease in frequency at $f_1$ resulting from the positive pulse 30 and an increase in frequency at $f_3$ resulting from the negative pulse 31.

If only the signal from the A lines was to be sent, a frequency modulated carrier would result. This carrier could be sent on the switched telephone network at a maximum average power for optimum signal to noise ratio. A small reduction (about 1db) in the average power will permit amplitude modulation of the frequency modulated carrier. If the duty cycle of the amplitude modulating pulses is small, each pulse can amplitude modulate the carrier to a peak power which may be as much as 9db above the maximum average power without causing the average power to exceed the maximum. The use of only positive pulses for positive amplitude modulation is preferred because it minimizes cross talk, but negative modulation could be used to carry information.

This technique results in only a slight loss in quality for the frequency modulating signal and permits a second signal to be sent with acceptable quality. After the modulated carrier has been sent through the switched telephone network it is demodulated and decoded using conventional techniques and fed to a print transducer having a pair of stylii located to mark two adjacent lines at once.

Since the B signal only has information as to transitions it is possible that it would produce a negative picture; thus it is preferable to have reindexing to either white or black at the start of each scan line to minimize the effect of errors due to noise. Also since the pulses forming the B signal are preferably of short duration (to minimize the amplitude modulation duty cycle), they may be clocked with the carrier to insure that the maximum peak power is obtained with each pulse.

The term frequency modulation is used in a broad sense to include phase modulation or any other type of modulation which has little or no component of amplitude modulation. The terms "only" frequency modulated or "only" amplitude modulated as used herein are intended to mean "substantially only" since most frequency modulators will produce some amplitude modulation and most amplitude modulators produce some frequency modulation. The limiting factor is, of course, the amount of cross talk which can be tolerated.

Figure 5:
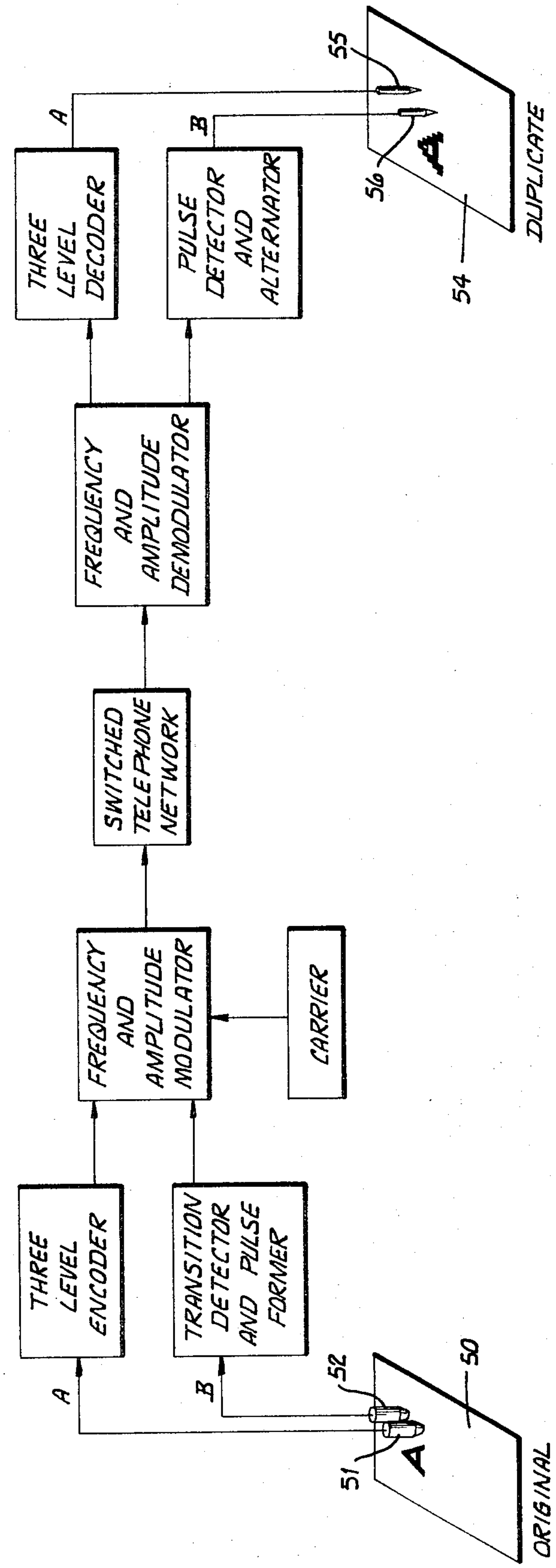
FIG. 5 is a block diagram illustrating the invention.

FIG. 5 is a block diagram illustrating the operation of a facsimile unit embodying applicant's invention. The information bearing medium to be sent is a piece of paper 50 with the letter A on it. Two optical scanning devices 51 and 52 are used to obtain two simultaneous optical signals. One of the signals, labelled A, connects to a conventional three level encoder and the other signal, labelled B, connects to a transition detector and pulse former. The transition detector detects changes from black to white and from white to black. Each time a change is detected a pulse is sent to the frequency and amplitude modulator. These pulses positively amplitude modulate the frequency modulated carrier which results from frequency modulation of a carrier by the three level encoded signal.

This amplitude and frequency modulated carrier passes through the switched telephone network and to a frequency and amplitude demodulator. The frequency modulation components of the modulated carrier are detected and sent to a three level decoder, the output of which controls a print stylus 55. The amplitude modulation components of the modulated carrier are detected and sent to a pulse detector and alternator, the output of which controls another print stylus 56. The pulse detector and alternator acts in a manner similar to a conventional flip-flop circuit. The two stylii 55 and 56 scan and print on the duplicate 54 to reproduce the image of the original.

In the embodiment described in FIG. 5, the source of the carrier is separate from the modulator. As an alternative embodiment, the oscillator which produces the carrier may itself be frequency modulated by the signal from the three level encoder. The order of modulation and the place of modulation is a matter of choice. It would be possible merely to simultaneously amplitude and frequency modulate an oscillator to produce the desired modulated carrier.

The invention claimed is:

1. A method of rapidly and simultaneously transmitting two separate facsimile signals over a telephone network which comprises:

optically scanning pairs of line simultaneously on an item to be sent, to obtain two separate facsimile signals, only frequency modulating an audio frequency carrier with a frequency modulating signal derived from one of the signals, converting the other of the two signals to a digital signal which is at a given potential more than 80 percent and less than 100 percent of the time, amplitude modulating the same carrier with said digital signal, transmitting the frequency and amplitude modulated carrier over the telephone network.

2. A method of rapidly and simultaneously transmitting two separate facsimile signals which comprises:

only frequency modulating a carrier with a frequency modulating signal derived from one of the facsimile signals, converting the other facsimile signal to a binary signal which consists of pulses which occur at optical transitions from black to white and white to black, amplitude modulating the same carrier with said binary signal, and transmitting said amplitude and frequency modulated carrier over a telephone network.

3. The method of claim 2 in which the amplitude modulation of said carrier is positive during said pulses.

4. The method of claim 2 in which said two separate facsimile signals are obtained by optically scanning pairs of lines simultaneously.

5. The method of claim 2 in which said transmitting is done through a switched telephone network.

6. The method of claim 2 in which said binary signal is at a given potential more than 80 percent and less than 100 percent of the time.

7. A combination for facsimile usable with a switched telephone network comprising:

a. scanning means for simultaneously scanning two lines of information on an information bearing medium and converting the information obtained by scanning to two electrical signals, b. means for frequency modulating a carrier with a frequency modulating signal derived from one of the facsimile signals, c. means for converting the other facsimile signal to a binary signal which consists of pulses which occur at optical transitions from black to white and white to black, and d. means for amplitude modulating the same carrier with said digital signal.

8. The combination of claim 7 in which said means for amplitude modulating is polarized to cause positive modulation during said pulses of said binary signal.

* * * * *